United States Patent Office 2,784,195
Patented Mar. 5, 1957

2,784,195

QUATERNARY AMMONIUM SALTS OF N-PHENYL-N-PICOLYL-DIALKYLAMINOALKYLAMINES

Robert R. Burtner, Skokie, Ill., assignor, by mesne assignments, to G. D. Searle & Co., Skokie, Ill., a corporation of Delaware No Drawing. Application March 30, 1953,
Serial No. 345,670

7 Claims. (Cl. 260—296)

This invention relates to quaternary ammonium salts of N-phenyl-N-picolyldialkylaminoalkylamines, and to processes for the preparation thereof. In particular, this invention relates to picoline derivatives of the formula

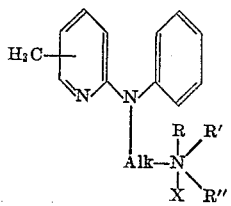

wherein Alk is a lower alkylene radical containing at least two and not more than four carbon atoms; R is a lower alkyl radical, that is, a radical containing not more than 4 carbon atoms; NR'R" is either a lower dialkylamino radical or a nitrogen-containing heteromonocyclic radical; and X is one equivalent of an anion.

In the compounds of the foregoing formula, Alk represents an alkylene radical such as ethylene, propylene, butylene, trimethylene, tetramethylene, and like bivalent radicals derived from saturated aliphatic hydrocarbons containing from 2 to 4 carbon atoms. The radical R represents a lower alkyl radical such as methyl, ethyl, propyl isopropyl, butyl, isobutyl, and secondary butyl. The radicals R' and R" represent lower alkyl radicals of the foregoing type; or, taken together with the attached nitrogen, they represent saturated, nitrogen-containing, heterocyclic radicals such as piperidino, morpholino, and pyrrolidino radicals. The substituent X represents one equivalent of an anion, as remarked, and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention are useful in medicine as anticholinergic agents. They have the property of blocking the transmission of nerve impulses across the autonomic ganglia, as well inhibiting nerve-impulse transmission at the neuroeffector junctions of the parasympathetic and cerebrospinal nervous systems. Thus the quaternary ammonium salts of this invention are capable of producing the chemical equivalent of sympathectomy, the surgical interruption of some portion of the sympathetic nervous pathways.

Because of their ability to block the autonomic ganglia, the instant compounds are valuable in the control of ulcer and other gastrointestinal dysfunctions associated with autonomic hyperactivity. In this respect they are distinct from the corresponding tertiary bases and their simple addition salts, the activity of which is largely limited to the neuroeffector junctions of the parasympathetic system. The latter compounds are commonly classified as spasmolytics in recognition of this essential difference between their properties and those which characterize the anticholinergic agents of the present invention.

The subject compounds are soluble in water, as also in aqueous solutions of alcohols and water-miscible organic solvents. They may be administered in solid form as tablets or capsules; dissolved in aqueous media they may be given parenterally.

The compounds to which this invention relates are conveniently prepared according to the following procedure: An α-halogenated picoline, for example, a 2-bromopicoline, is reacted with aniline in the presence of a condensing agent such as potassium carbonate or, preferably, copper powder, to form an N-phenyl-N-α-picolylamine. The condensation is ordinarily carried out at elevated temperatures (120° to 175° centigrade) and reduced pressures (25 to 60 millimeters of mercury) over periods of time ranging upward from one hour. One suitable combination of temperature, pressure, and time is 140° to 150° centigrade at 40 millimeters pressure for six hours. The phenylpicolylamine is, in turn, reacted successively with a condensing agent, such as sodamide, and a dialkylaminoalkyl halide, for example diethylaminoethyl chloride, to produce the corresponding N-phenyl-N-α-picolyldialkylaminoalkylamine. Various inert, non-polar, organic liquids will serve as reaction media, toluene having been found a solvent of choice when sodamide is the condensing agent. With potassium carbonate, methyl ethyl ketone may be used. The reaction is commonly run at temperatures of 90° to 110° centigrade and completed after approximately 20 hours. Temperatures of the order of 20° higher or lower may also be used, and the reaction time may vary from 10 to as long as 36 hours. An inert atmosphere, such as a nitrogen atmosphere, is ordinarily maintained throughout the course of the reaction, though this may be dispensed with after the first 2 or 3 hours. The N-phenyl-N-α-picolyldialkylaminoalkylamine thus formed, the formula of which is

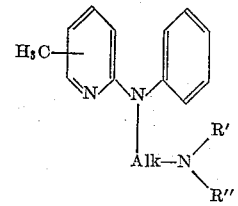

where Alk, R' and R" have the meanings hereinbefore defined, is then quaternized by addition of an alkyl ester of the formula

R—X

—R and X having the meanings hereinabove assigned—using temperatures in the range of 0° to 50° centigrade and an inert solvent such as chloroform, acetone, methyl ethyl ketone, methanol, butanol, and the like. The reaction is ordinarily completed in from 12 to 48 hours and is generally carried out in a closed system if a lower alkyl halide, such as methyl chloride, is one of the reagents. Using methyl chloride, the reaction may be smoothly effected in chloroform solution at 25° C. for 24 hours.

The following examples will illustrate in detail certain of the picoline derivatives which constitute the present invention, and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

EXAMPLE 1

A. *N-(6-methyl-2-pyridyl)-N-phenylamine.*—A mixture of 344 parts of 2-bromo-6-methylpyridine, 186 parts of aniline, and 10 parts of copper powder is heated in a jacketed vessel at 140 to 150° C. (jacket temperature) and an absolute pressure of 40 mm. of mercury for 6 hours. An excess of 10% aqueous muriatic acid is added, whereupon the copper is filtered out and the reactants then made alkaline with an excess of 25% aqueous caustic soda. The base, thus precipitated as an oil, is extracted into ether. The ether solution is washed with water, following which the solvent is stripped, and the residue is then subjected to vacuum distillation. The distillate, a pale yellow oil, B. P. 180–182° C. at 8 mm. pressure, is the desired product.

B. *N-(6-methyl - 2 - pyridyl)-N - phenyldiethyl-amino-ethylamine.*—To a stirred suspension of 63 parts of sodamide in 2700 parts of dry toluene at 90–100° C. under an atmosphere of nitrogen is added 298 parts of N-(6-methyl-2-pyridyl)-N-phenylamine. The reactants are refluxed and stirred for approximately 3 hours, at the end of which time heating is discontinued and 217 parts of diethylaminoethyl chloride is slowly added. An exothermic reaction ensues, following which heat is again applied and reflux continued for 15 hours. Approximately 3000 parts of water is then added, whereupon the toluene layer is, successively, separated, washed with water, and subjected to vacuum distillation to remove the solvent. The dark viscous oil which remains is the desired N-(6-methyl - 2 - pyridyl)-N-phenyldiethylamino-ethylamine. It may be converted to the hydrochloric acid salt by dissolving in 3400 parts of anhydrous ether and treating with two molecular equivalents of absolute alcoholic hydrogen chloride solution. The salt is isolated by decanting the supernatant ether-alcohol layer, taking up the residue in 13 volumes of a mixture of 1000 parts of isopropyl alcohol and 4500 parts of ethyl acetate at the boiling point, and then allowing the solution to cool and stand at 25° C. The dihydrochloride comes out as white crystals which, recovered on a funnel and dried at 75° C., melt at 192° C. The product is moderately hygroscopic and easily soluble in water.

C. *N-(6 - methyl - 2 - pyridyl)-N-phenyldiethylamino-ethylamine methobromide.*—A solution of 320 parts of N-(6-methyl-2-pyridyl)-N-phenyldiethylaminoethylamine and 107 parts of methyl bromide in 1500 parts of dry chloroform is allowed to react in a closed system for 24 hours at 25° C. The solvent is then distilled off, leaving a viscous residue which is taken up in 4000 parts of anhydrous ether. The crystalline quaternary compound forms on standing. It is filtered off, rinsed with ether, and finally dried at 75° C. The product is obtained as white crystals, M. P. 130–131° C., and is readily soluble in water. It has the formula

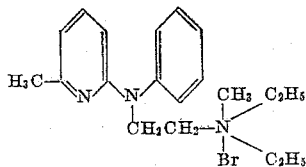

EXAMPLE 2

A. *N-(4-methyl-2-pyridyl)-N-phenylamine.*—A mixture of 344 parts of 2-bromo-4-methylpyridine, 186 parts of aniline, and 10 parts of copper powder is heated in a jacketed vessel at 140–150° C. (jacket temperature) and an absolute pressure of 40 mm. of mercury for 6 hours according to the technique of Example 1A. The mixture, which refluxes gently during the first hour, gradually becomes more viscous and ceases reflux as the reaction progresses. At the end of the prescribed heating period, the reactants are acidified with approximately 6700 parts of 10% aqueous muriatic acid, filtered, and made alkaline with an excess of 25% aqueous caustic soda, in that order. The base so precipitated granulates on standing, and is thereupon filtered out and, successively, ground and washed with water, dried, and finally recrystallized from 1900 parts of cyclohexane to give nearly white plates, M. P. 119° C.

B. *N-(4-methyl - 2 - pyridyl) - N - phenyldiethylamino-ethylamine.*—Using essentially the procedure of Example 1B, 177 parts of N-(4-methyl-2-pyridyl)-N-phenylamine, 38 parts of sodamide, and 130 parts of diethylaminoethyl chloride in 2600 parts of dry toluene are reacted at reflux temperatures for 20 hours to give, in good yield, the desired N-(4-methyl-2-pyridyl) - N - phenyldiethylamino-ethylamine as an oil. The base may be converted to the dihydrochloride by reaction in anhydrous ether solution with two molecular equivalents of absolute alcoholic hydrogen chloride solution. The salt comes down as a viscous oil which granulates on standing. Recrystallization from 10 volumes of a mixture of 23 parts of isopropyl alcohol and 110 parts of ethyl acetate gives, following treatment with decolorizing charcoal, colorless crystals, M. P. 195–196° C. The dihydrochloride is quite soluble in water.

C. *N-(4-methyl-2-pyridyl)-N-phenyldiethylaminoethyl-amine methyl bromide.*—A solution of 140 parts of N-(4-methyl-2-pyridyl)-N-phenyldiethylaminoethylamine and 48 parts of methyl bromide in 7500 parts of chloroform is stored in a closed container for 24 hours at 25° C., at the end of which time the bulk of the solvent is removed by vacuum distillation and 2500 parts anhydrous ether is then added to the viscous residue. The product, which becomes crystalline on standing, is recrystallized from 6 volumes of a mixture of 16 parts of isopropyl alcohol and 72 parts of ethyl acetate to give, on treatment with decolorizing charcoal, nearly colorless crystals, M. P. 164° C. The product, which is readily soluble in water, has the formula

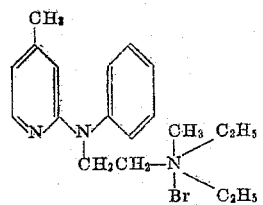

EXAMPLE 3

A. *N-(4-methyl-2-pyridyl)-N-phenyl-β-dimethylamino-propylamine.*—The secondary amine of the preceding Example 2A is converted to the tertiary β-dimethylamino-propylamine according to the following procedure: 170 parts of N-(4-methyl-2-pyridyl)N-phenylamine, 39 parts of sodamide, and 122 parts of β-dimethylaminopropyl chloride in 2700 parts of dry toluene are reacted as described in Example 1B. There results a good yield of N-(4-methyl - 2 - pyridyl) - N - phenyl-β-dimethylamino-propylamine which, treated in anhydrous ether solution with two molecular equivalents of absolute alcoholic hydrogen chloride solution, gives the dihydrochloride.

B. *N-(4-methyl-2-pyridyl)-N-phenyl-β-dimethylamino-propylamine ethyl iodide.*—The tertiary base of the preceding Example 3A is quaternized as described in Example 1C by reacting 255 parts thereof together with 170 parts of ethyl iodide, in 1500 parts of dry chloroform. Upon removal of solvent and addition of ether, the desired product is obtained as a viscous oil which granulates on standing. It has the formula

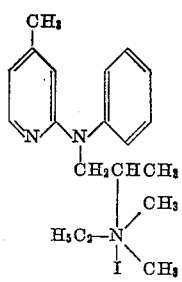

EXAMPLE 4

A. *N-(6-methyl-2-pyridyl)-N-phenyl-β-di-n-butylaminopropylamine.*—To a stirred suspension of 39 parts of sodamide in 3500 parts of benzene at reflux temperature under a nitrogen atmosphere is added 170 parts of N-(6-methyl-2-pyridyl)-N-phenylamine prepared according to the directions of Example 1A. The reaction mixture is maintained at reflux temperature with stirring until evolution of ammonia gas ceases, which is usually after about 5 hours. At this point, heating is temporarily discontinued while 250 parts of β-di-n-butylaminopropyl chloride is slowly added, following which heat is again applied and reflux continued with stirring for 24 hours. Approximately 4000 parts of water is then added, whereupon the benzene layer is, successively, separated, washed with water, and subjected to vacuum distillation to remove the solvent. The residual dark, viscous oil is the desired product. It may be converted to the hydrochloric acid salt by dissolution in 3000 parts of anhydrous ether and subsequent reaction with two molecular equivalents of absolute alcoholic hydrogen chloride solution according to the technique of Example 1B. The dihydrochloride is quite soluble in water.

B. *N-(6-methyl-2-pyridyl)-N-phenyl-β-di-n-butylaminopropylamine ethyl sulfate.*—A mixture consisting of 339 parts of the base of Example 4A, 154 parts of diethyl sulfate, and 1500 parts of anhydrous butanol is maintained at 50° C., with stirring, for 30 hours. The quaternary ammonium compound so prepared has the formula

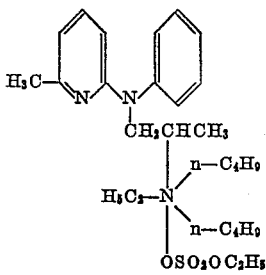

I claim:
1. A compound of the formula

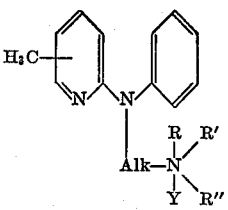

wherein Alk is a lower alkylene radical containing at least two and not more than four carbon atoms; R is a lower alkyl radical; NR'R" is a member of the group consisting of lower dialkylamino, pyrrolidino, morpholino, and piperidino radicals; and X is one equivalent of a non-toxic anion.

2. An N-phenyl-N-picolyldialkylaminoethylamine quaternary salt of the formula

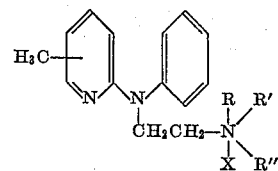

wherein R, R' and R" are lower alkyl groups and X is halogen.

3. An N-phenyl-N-picolyldialkylaminoethylamine methobromide of the formula

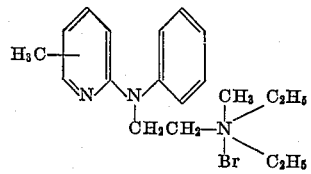

4. N-(6-methyl-2-pyridyl)-N-phenyldiethylaminoethylamine methobromide.
5. N-(4-methyl-2-pyridyl)-N-phenyldiethylaminoethylamine methobromide.
6. N-(4-methyl-2-pyridyl)-N-phenyl-β-dimethylaminopropylamine ethyl iodide.
7. N-(6-methyl-2-pyridyl)-N-phenyl-β-di-n-butylaminopropylamine ethyl sulfate.

References Cited in the file of this patent
UNITED STATES PATENTS

| | | |
|---|---|---|
| 2,406,594 | Djerassi et al. | Aug. 27, 1946 |
| 2,479,843 | Knox et al. | Aug. 23, 1949 |
| 2,502,151 | Horclois | Mar. 28, 1950 |
| 2,623,880 | Hopff et al. | Dec. 30, 1952 |

OTHER REFERENCES

Idson: Chem. Reviews, vol. 47 (Dec. 1950) pp. 341–44, 377–79, 462–66, 470–73, 477–79, 505–08.